(12) United States Patent
Rebert et al.

(10) Patent No.: US 9,544,469 B2
(45) Date of Patent: *Jan. 10, 2017

(54) SYSTEM AND METHOD FOR SENDING, DELIVERY AND RECEIVING OF FAXES

(71) Applicant: Open Text S.A., Luxembourg (LU)

(72) Inventors: Treber Rebert, Tucson, AZ (US); Jonathan Isabelle, Tucson, AZ (US); Michael Riedel, Tucson, AZ (US)

(73) Assignee: Open Text SA ULC, Halifax, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,958

(22) Filed: Dec. 1, 2014

(65) Prior Publication Data

US 2015/0085324 A1    Mar. 26, 2015

Related U.S. Application Data

(63) Continuation of application No. 13/461,351, filed on May 1, 2012, now Pat. No. 8,937,736.

(51) Int. Cl.
| | | |
|---|---|---|
| *H04N 1/00* | (2006.01) | |
| *H04N 1/42* | (2006.01) | |
| *H04N 1/32* | (2006.01) | |

(52) U.S. Cl.
CPC ............ *H04N 1/42* (2013.01); *H04N 1/0022* (2013.01); *H04N 1/00095* (2013.01); *H04N 1/00212* (2013.01); *H04N 1/00281* (2013.01); *H04N 1/00973* (2013.01); *H04N 1/32406* (2013.01); *H04N 1/32411* (2013.01); *H04N 2201/0093* (2013.01)

(58) Field of Classification Search
None
See application file for complete search history.

(56) References Cited

U.S. PATENT DOCUMENTS

| | | |
|---|---|---|
| 5,644,404 A | 7/1997 | Hashimoto et al. |
| 5,754,640 A | 5/1998 | Sosnowski |
| 5,761,284 A | 6/1998 | Ranalli et al. |

(Continued)

FOREIGN PATENT DOCUMENTS

| | | |
|---|---|---|
| JP | 2003319128 | 11/2003 |
| WO | WO0160050 | 8/2001 |
| WO | WO03061270 | 7/2003 |

OTHER PUBLICATIONS

Office Action issued for U.S. Appl. No. 13/315,978, mailed Dec. 16, 2013, 14 pages.

(Continued)

*Primary Examiner* — Kimberly A Williams
(74) *Attorney, Agent, or Firm* — Sprinkle IP Law Group

(57) ABSTRACT

Embodiments of systems and methods for the sending, delivery and receiving of faxes are disclosed herein. In particular, certain embodiments include a fax connector that may be deployed at a user's site, and a faxing system that may be deployed remotely from the user's site. The fax connector can be accessed at the user's site over a computer based network in order to perform functions associated with faxing, including sending, receiving and obtaining status on faxes. The fax connector deployed at the user's site communicates with the remotely deployed faxing system to send, receive, obtain status on, or perform other functions associated with, faxing.

20 Claims, 6 Drawing Sheets

(56) References Cited

U.S. PATENT DOCUMENTS

| | | | |
|---|---|---|---|
| 5,862,202 A | 1/1999 | Bashoura et al. | |
| 5,999,601 A | 12/1999 | Wells et al. | |
| 6,020,980 A | 2/2000 | Freeman | |
| 6,058,169 A * | 5/2000 | Bramnick et al. | 379/100.01 |
| 6,259,538 B1 * | 7/2001 | Amit | H04N 1/33323 |
| | | | 358/407 |
| 6,539,077 B1 | 3/2003 | Ranalli et al. | |
| 6,603,569 B1 | 8/2003 | Johnson, Jr. et al. | |
| 6,618,165 B1 | 9/2003 | Sehgal | |
| 6,825,947 B1 | 11/2004 | Asai | |
| 6,922,255 B1 | 7/2005 | Tomida | |
| 7,324,223 B1 | 1/2008 | Mori | |
| 7,653,185 B2 | 1/2010 | Rebert et al. | |
| 8,249,228 B2 | 8/2012 | Street, Jr. | |
| 8,310,710 B2 | 11/2012 | Phillips et al. | |
| 8,493,606 B2 | 7/2013 | Phillips et al. | |
| 8,937,736 B2 | 1/2015 | Rebert et al. | |
| 8,970,880 B2 | 3/2015 | Riedel et al. | |
| 8,970,881 B1 | 3/2015 | Schwarz | |
| 8,995,025 B2 | 3/2015 | Rebert | |
| 2001/0005268 A1 | 6/2001 | Eguchi | |
| 2001/0005864 A1 | 6/2001 | Mousseau | |
| 2001/0027478 A1 | 10/2001 | Meier | |
| 2001/0056538 A1 | 12/2001 | Amano | |
| 2002/0018245 A1 | 2/2002 | Saito et al. | |
| 2002/0021791 A1 | 2/2002 | Heilmann | |
| 2002/0026498 A1 | 2/2002 | Kim | |
| 2002/0033961 A1 | 3/2002 | Murphy | |
| 2002/0051146 A1 | 5/2002 | Tanimoto | |
| 2002/0157028 A1 | 10/2002 | Koue et al. | |
| 2003/0053444 A1 | 3/2003 | Swartz | |
| 2003/0086124 A1 | 5/2003 | Parry | |
| 2003/0142801 A1 | 7/2003 | Pecht | |
| 2004/0136513 A1 | 7/2004 | Chiu | |
| 2005/0086240 A1 | 4/2005 | Richardson et al. | |
| 2005/0094176 A1 | 5/2005 | Matsuishi | |
| 2005/0108323 A1 | 5/2005 | Taylor | |
| 2005/0162706 A1 | 7/2005 | Eguchi | |
| 2005/0190402 A1 | 9/2005 | Nakamura | |
| 2005/0270558 A1 | 12/2005 | Konsella et al. | |
| 2005/0275871 A1 | 12/2005 | Baird et al. | |
| 2006/0227367 A1 | 10/2006 | Kitada | |
| 2007/0130365 A1 | 6/2007 | Rebert et al. | |
| 2007/0146802 A1 | 6/2007 | Ushida | |
| 2007/0150242 A1 | 6/2007 | Kitada | |
| 2007/0168557 A1 | 7/2007 | Henry | |
| 2007/0297002 A1 | 12/2007 | Hase | |
| 2008/0019519 A1 | 1/2008 | Su | |
| 2008/0065477 A1 | 3/2008 | Korhonen | |
| 2008/0155108 A1 | 6/2008 | Morris | |
| 2009/0034015 A1 | 2/2009 | Mulligan | |
| 2009/0067414 A1 | 3/2009 | Toscano et al. | |
| 2009/0073499 A1 | 3/2009 | Glunz | |
| 2009/0161168 A1 | 6/2009 | Miyamoto | |
| 2009/0190159 A1 | 7/2009 | Toscano et al. | |
| 2009/0222663 A1 | 9/2009 | Chow et al. | |
| 2009/0316203 A1 | 12/2009 | Dukie | |
| 2009/0323100 A1 * | 12/2009 | Lee | 358/1.15 |
| 2010/0002260 A1 | 1/2010 | Naylor et al. | |
| 2010/0007917 A1 | 1/2010 | Webster et al. | |
| 2010/0039678 A1 | 2/2010 | Noel et al. | |
| 2010/0067063 A1 | 3/2010 | Jang | |
| 2010/0075673 A1 | 3/2010 | Colbert et al. | |
| 2010/0085609 A1 | 4/2010 | Hong | |
| 2010/0182651 A1 | 7/2010 | Rebert et al. | |
| 2010/0281016 A1 | 11/2010 | Weissman | |
| 2010/0296121 A1 | 11/2010 | Shaheen, III et al. | |
| 2011/0110366 A1 | 5/2011 | Moore et al. | |
| 2011/0211218 A1 | 9/2011 | Gilmore | |
| 2012/0143658 A1 | 6/2012 | Toscano | |
| 2012/0297471 A1 | 11/2012 | Smithson | |
| 2013/0091042 A1 | 4/2013 | Misawa | |
| 2013/0287189 A1 | 10/2013 | Cichielo et al. | |
| 2013/0293933 A1 | 11/2013 | Rebert et al. | |
| 2013/0346522 A1 | 12/2013 | Lennstrom et al. | |
| 2014/0204411 A1 | 7/2014 | Riedel et al. | |
| 2014/0307294 A1 | 10/2014 | Rebert | |
| 2014/0340717 A1 * | 11/2014 | Meiyappan | 358/400 |
| 2015/0085324 A1 | 3/2015 | Rebert | |
| 2015/0138601 A1 | 5/2015 | Riedel et al. | |
| 2015/0146256 A1 | 5/2015 | Schwarz | |
| 2015/0181075 A1 | 6/2015 | Rebert | |
| 2015/0319338 A1 | 11/2015 | Rebert | |

OTHER PUBLICATIONS

Notice of Allowance issued for U.S. Appl. No. 13/316,001, mailed Dec. 23, 2013, 9 pages.

Schneider, "Introduction to Multi-Tenant Architecture," Feb. 11, 2009, [retrieved on Dec. 8, 2010, from <<http:www.developer.com/design/article.php/3801931>>4 pages.

"Multi-tenant Architecture," © 2009-2010 Zscaler, Inc., [retrieved on Dec. 8, 2010, from <<http://www.zscaler.com/multi-tenant.html>>] 2 pages.

Chong et al., "Architecture Strategies for Catching the Long Tail," Microsoft Corporation, Apr. 2006, [retrieved on Dec. 8, 2010, from <<http://msdn.microsoft.com/en-us/library/aa479069(printer).aspx>>, 20 pages.

"Cloud-based Networking-Why Multi-tenancy Matters," White Paper, ©2010 Pareto Networks™, 14 pages.

Notice of Allowance issued for U.S. Appl. No. 13/316,001, mailed Apr. 3, 2014, 6 pages.

Notice of Allowance issued for U.S. Appl. No. 13/315,978, mailed Apr. 7, 2014, 7 pages.

Partial Search Report issued for European Patent Application No. 13 173 845.2, mailed on Nov. 14, 2013, 5 pages.

Extended Search Report issued for European Patent Application No. 13 173 845.2, mailed on Mar. 4, 2014, 9 pages.

International Search Report and Written Opinion issued for PCT Application No. PCT/EP2013/059026, completed on Jun. 21, 2013 and mailed on Jul. 2, 2013, 10 pages.

Notice of Allowance issued for U.S. Appl. No. 13/461,351, mailed Apr. 23, 2014, 6 pages.

Office Action issued for U.S. Appl. No. 13/485,140, mailed Feb. 24, 2014, 14 pages.

Notice of Allowance issued for U.S. Appl. No. 13/315,978, mailed Jul. 14, 2014, 7 pages.

Notice of Allowance issued for U.S. Appl. No. 13/461,351, mailed Jul. 22, 2014, 5 pages.

Final Office Action issued for U.S. Appl. No. 13/485,140, mailed on Aug. 7, 2014, 18 pages.

Notice of Allowance issued for U.S. Appl. No. 13/316,001, mailed Aug. 28, 2014, 4 pages.

Notice of Allowance issued for U.S. Appl. No. 13/461,351, mailed Aug. 28, 2014, 2 pages.

Notice of Allowance issued for U.S. Appl. No. 13/315,978, mailed Oct. 22, 2014, 7 pages.

Notice of Allowance issued for U.S. Appl. No. 13/316,001, mailed Oct. 27, 2014, 6 pages.

International Preliminary Report on Patentability (IPRP) issued for PCT Application No. PCT/EP2013/059026, mailed on Nov. 13, 2014, 7 pages.

Notice of Allowance issued in U.S. Appl. No. 13/485,140, mailed Nov. 18, 2014, 9 pages.

Office Action issued for U.S. Appl. No. 14/606,519, mailed Mar. 9, 2015, 15 pages.

Office Action issued for U.S. Appl. No. 14/606,523, mailed Mar. 11, 2015, 11 pages.

Office Action issued for U.S. Appl. No. 13/927,023, mailed Apr. 7, 2015, 16 pages.

Office Action issued for U.S. Appl. No. 14/606,519, mailed Sep. 8, 2015, 14 pages.

Office Action issued for U.S. Appl. No. 13/927,023, mailed Sep. 23, 2015, 20 pages.

Office Action issued for U.S. Appl. No. 14/800,350, mailed Sep. 10, 2015, 8 pages.

Office Action issued for U.S. Appl. No. 14/606,523, mailed Oct. 19, 2015, 18 pages.

(56) References Cited

OTHER PUBLICATIONS

Final Office Action issued for U.S. Appl. No. 14/606,519, mailed Dec. 17, 2015, 14 pages.
Notice of Allowance issued for U.S. Appl. No. 14/800,350, mailed Jan. 11, 2016, 5 pages.
Office Action issued for U.S. Appl. No. 13/927,023, mailed Feb. 9, 2016, 21 pages.
Office Action issued for U.S. Appl. No. 14/612,969, mailed Feb. 29, 2016, 18 pages.
Notice of Allowance issued for U.S. Appl. No. 14/606,523, mailed Apr. 8, 2016, 15 pages.
Notice of Allowance issued for U.S. Appl. No. 14/800,350, mailed Apr. 22, 2016, 3 pages.
Office Action for U.S. Appl. No. 14/606,591, mailed May 3, 2016, 14 pgs.
Notice of Allowance issued for U.S. Appl. No. 14/606,523, mailed Jul. 15, 2016, 6 pages.
Office Action issued for U.S. Appl. No. 14/612,969, mailed Aug. 2, 2016, 19 pages.
Notice of Allowance issued for U.S. Appl. No. 13/927,023, mailed Aug. 10, 2016, 11 pages.
Notice of Allowance issued for U.S. Appl. No. 14/800,350, mailed Aug. 10, 2016, 3 pages.
Corrected Notice of Allowance issued for U.S. Appl. No. 13/927,023, mailed Aug. 24, 2016, 8 pages.
Office action issued for U.S. Appl. No. 14/606,519, mailed Oct. 12, 2016, 15 pages.

\* cited by examiner

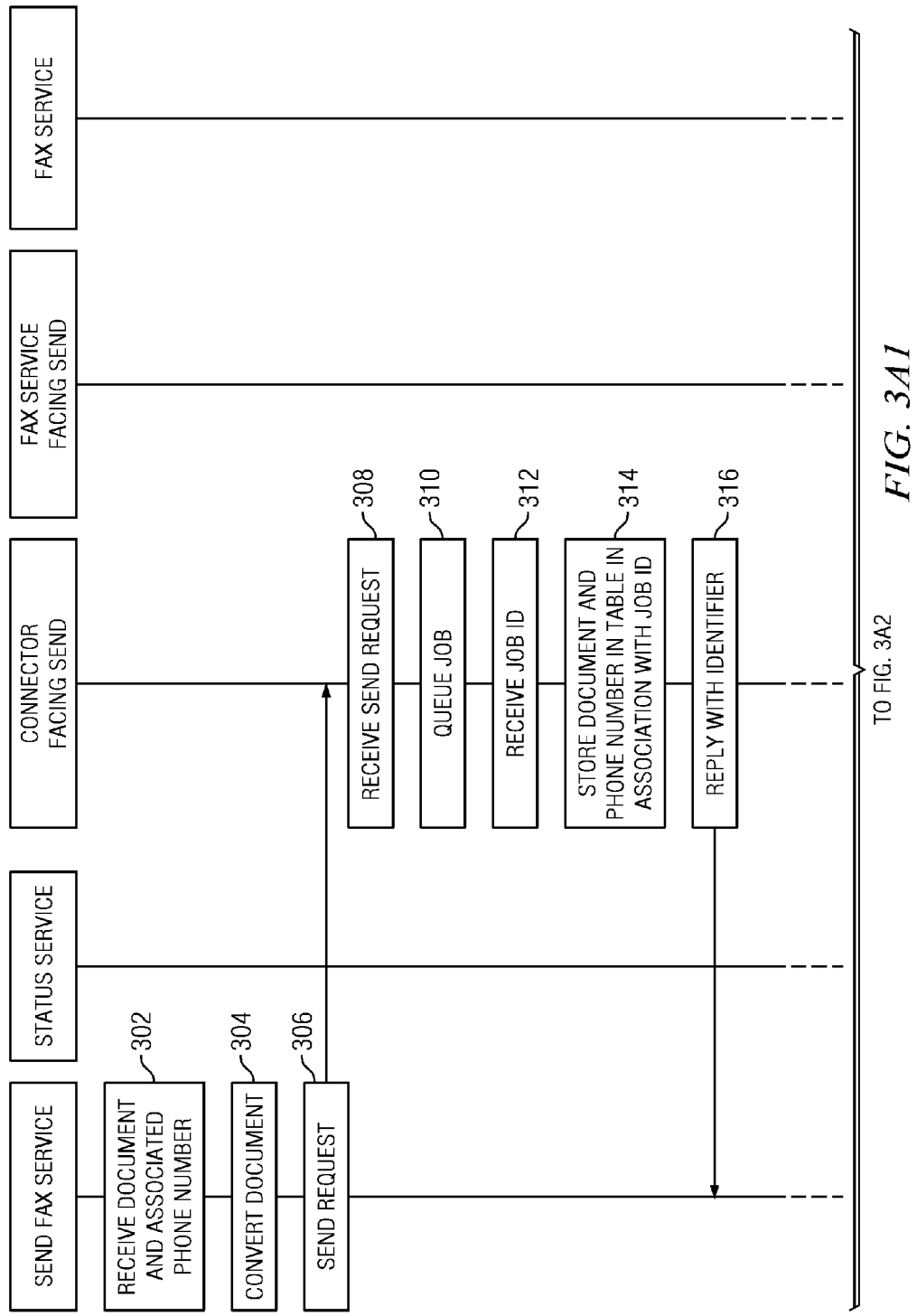

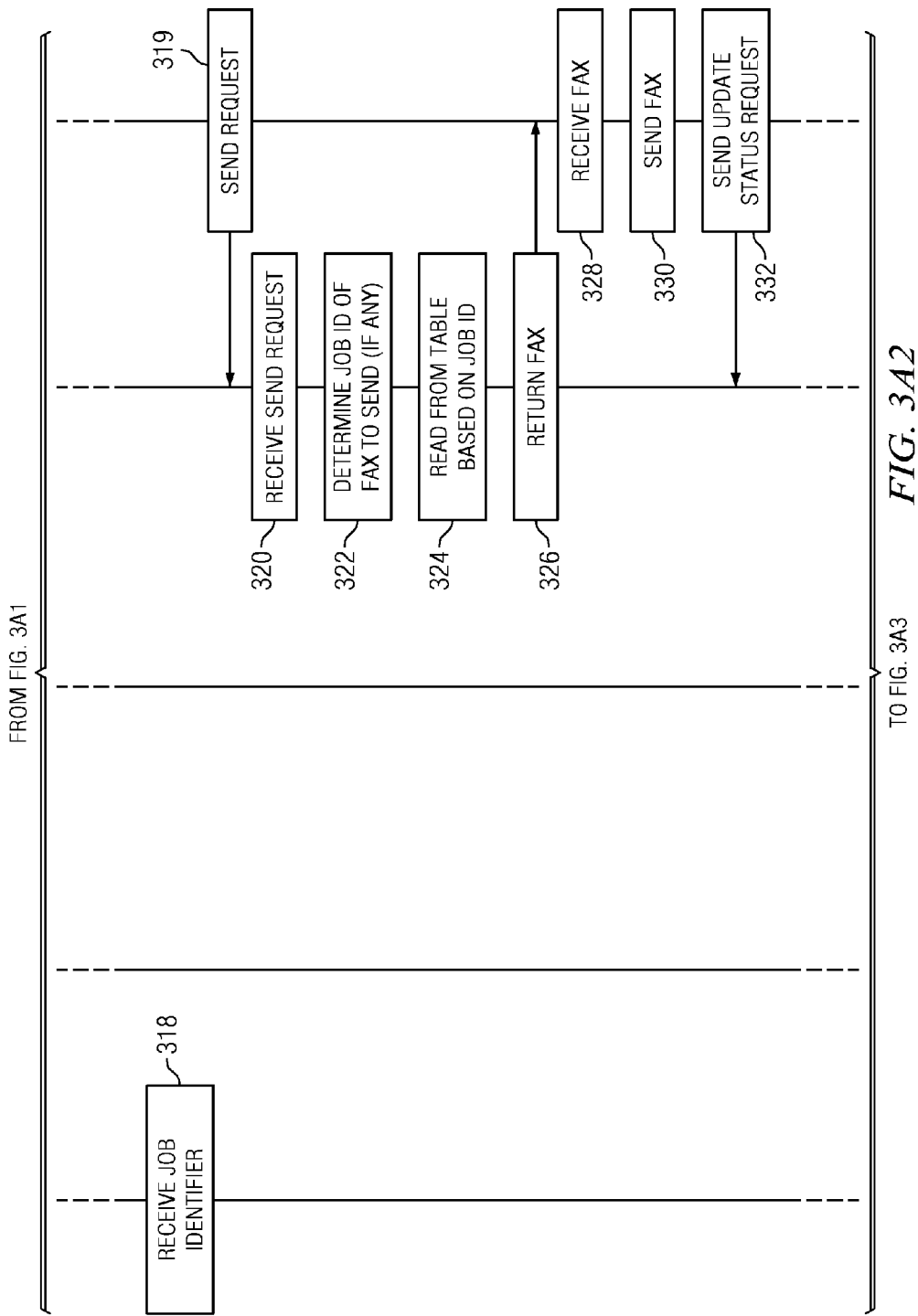
FIG. 3A2

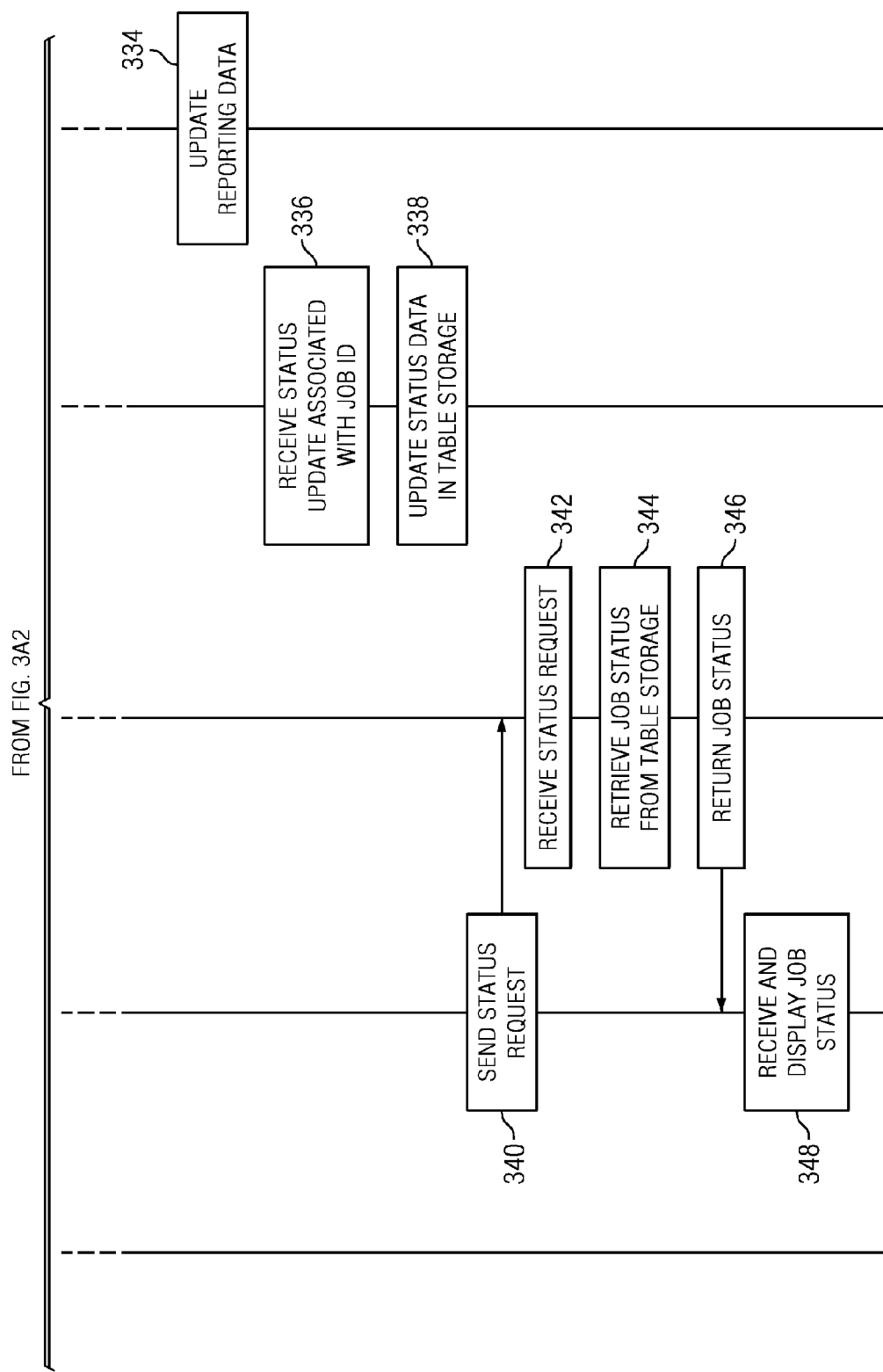
FIG. 3A3

SYSTEM AND METHOD FOR SENDING, DELIVERY AND RECEIVING OF FAXES

CROSS-REFERENCE TO RELATED APPLICATION(S)

This patent application is a continuation of, and claims a benefit of priority under 35 U.S.C. §120 from U.S. patent application Ser. No. 13/461,351, filed May 1, 2012, entitled "SYSTEM AND METHOD FOR SENDING, DELIVERY AND RECEIVING OF FAXES," which is hereby fully incorporated by reference herein for all purposes.

TECHNICAL FIELD

This disclosure relates generally to digital content delivery in a network environment. More particularly, this disclosure relates the transmission, delivery or reception of faxes through network based protocols or telephone networks. Even more specifically, this disclosure relates to the transmission, delivery or reception of faxes using distributed services.

BACKGROUND

A facsimile (fax) comprises a document in a digital image format. The document is associated with metadata that specifies a destination with respect to the publicly switched telephone network (PSTN). Thus, typically for at least a portion of the transmission, the document is transmitted over the PSTN. Faxing provides a secure, traceable and non-repudiable mechanism for content delivery and can be particularly useful in business environments.

Faxing, however, has limitations. For example, conventional fax machines can only transmit black and white files with limited resolution in a specific format such as the Tagged Image File Format (TIFF). Further, the transmission speed can be very slow compared to today's Internet based standards. Not surprisingly, the faxing technology in recent years has faced increasing competition from Internet Protocol (IP) network (e.g. Internet, LANs, WANs, intranets, extranets, etc.) based alternatives (generally referred to as Internet faxing). For example, instead of standalone fax machines, fax servers may be utilized in enterprise network environments. Typically, a fax server is a server computer having the necessary fax software and hardware to receive and send faxes over IP networks. Using fax servers may reduce the cost of transmission since there is no telephone connection charge when sending a fax over the Internet.

Internet based alternatives to physical fax machines are not without drawbacks. One challenge is that the Internet carries a vast range of information resources and services over a hodge-podge of protocols. For example, a user may send an email over the Internet, upload a file to a network site, and make a phone call over the Internet. The email may be sent via the Simple Mail transfer Protocol (SMTP), the file may be uploaded via the File Transfer Protocol (FTP), and the phone call may be conducted using the Voice over Internet Protocol (VoIP). Many existing network protocols do not meet the secure, traceable and non-repudiable needs of today's businesses. For example, the email (along with any attachment) as well as the file sent over the Internet unencrypted can be vulnerable to interception.

Additionally, network faxing solutions may include the need to access fax modems, routers or the PSTN (e.g. telephone lines) at the user's physical location. Increasingly, however, in most other areas of communication, including telephony itself, the trend has been toward use of the IP network based protocols (e.g. SMTP, FTP, VoIP, etc.). Accordingly, many traditional fax users no longer wish to maintain telephone lines or other access to the PSTN. It would therefore be desirable to give these users the ability to continue sending and receiving faxes without having to maintain local access to the PSTN.

SUMMARY

To address these needs, among others, embodiments of systems and methods for the sending, delivery and receiving of faxes are disclosed herein. In particular, certain embodiments include a fax connector that may be deployed at a user's site, and a faxing system that may be deployed remotely from the user's site. The fax connector can be accessed at the user's site over a computer based network in order to perform functions associated with faxing, including sending, receiving and obtaining status on faxes. The fax connector deployed at the user's site communicates with the remotely deployed faxing system to send, receive, obtain status on, or perform other functions associated with, faxing.

Because, in most cases, fax users already perform faxing utilizing fax servers, fax appliances, fax software, etc. connected to an computer based network (e.g. an IP (or other protocol) based network), faxing can be accomplished using embodiments of such systems and methods substantially without deviation from the user's previous faxing methodologies or workflows. Thus, such users can use their familiar fax environment without the restrictions of using a browser and without the need to maintain local telephony hardware, licenses, or telephone lines.

In certain embodiments, a set of services deployed on a cloud computing platform may be configured to receive a request over a computer based network to send a fax from a fax connector at a user's site, receive the document and destination telephone number associated with the fax and send the fax over the PSTN using a fax service.

In one embodiment, the fax service may send a request to the set of services to determine if there any faxes to send. The set of services may receive the request, determine that the fax is to be sent and return the document to the fax service over the computer based network.

One or more embodiments may receive a request for a status of the fax from the fax connector and return the status to the fax connector over the computer based network. The status may be updated by the fax service over the computer based network.

In other embodiments, the fax service may receive a fax over the PSTN, and send the document associated with the received fax to the set of services which determines a fax connector identifier to associate with the received document and sends the document to the fax connector at the user's site associated with the fax connector identifier over the computer based network.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 3A1-3B depict one embodiment for sending or receiving a fax.

DETAILED DESCRIPTION

Figure 1:
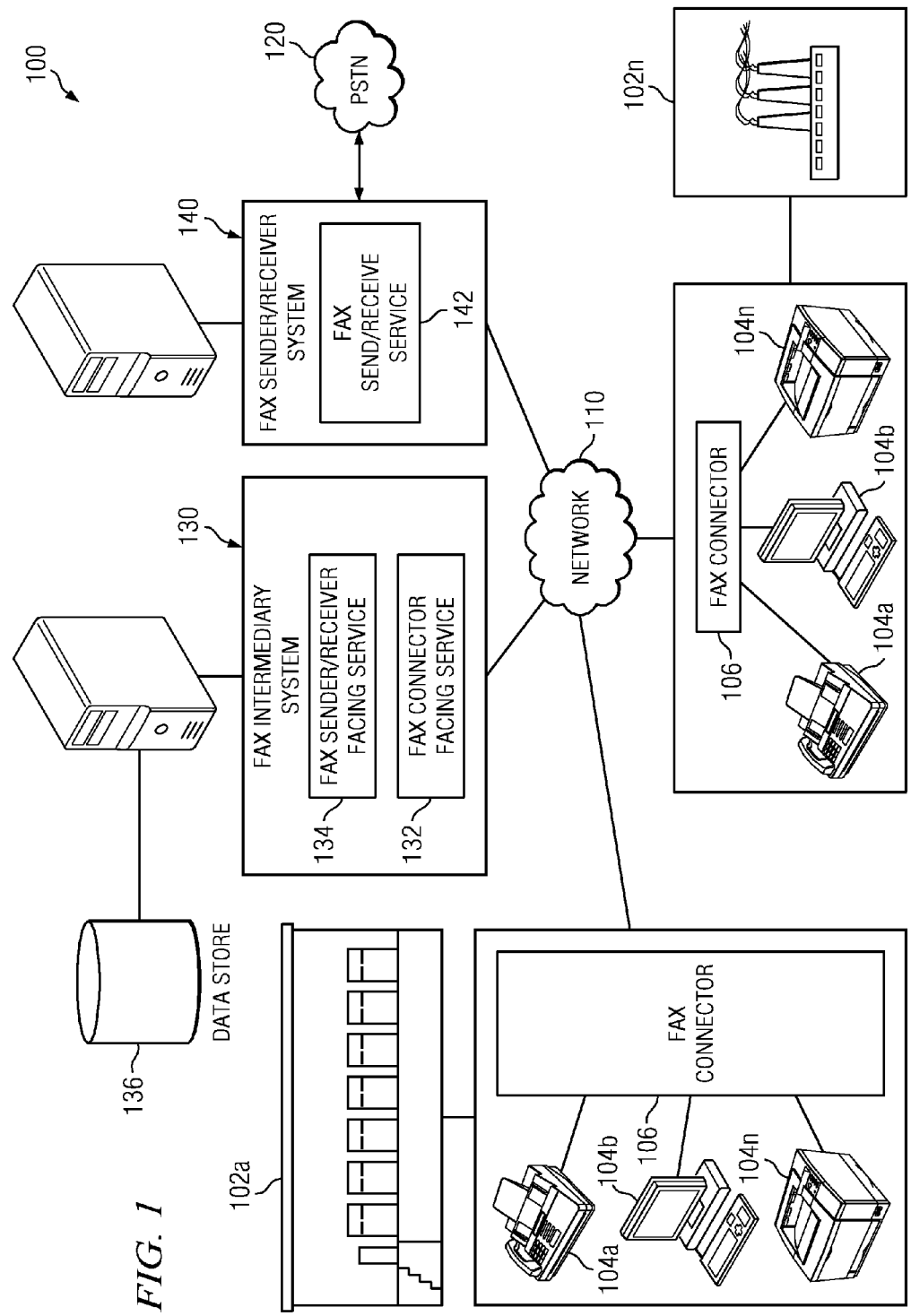
FIG. 1 depicts one embodiment of an architecture for a faxing system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a service is one or more computer processes, computing devices or both, configured to perform one or more functions. A service may present one or more interfaces which can be utilized to access these functions. Such interfaces include APIs, interfaces presented for a web services, remote procedure calls, remote method invocation, etc.

Before discussing specific embodiments a brief overview of the context of the disclosure may be helpful. As discussed above it is desirable to give these users the ability to continue sending and receiving faxes without having to maintain local access to the PSTN.

To that end, attention is now directed toward the embodiments of systems and methods for the sending, delivery and receiving of faxes disclosed herein. In particular, certain embodiments include a fax connector that may be deployed at a user's site, and a faxing system that may be deployed remotely from the user's site. The fax connector can be accessed at the user's site over a computer based network in order to perform functions associated with faxing, including sending, receiving and obtaining status on faxes. The fax connector deployed at the user's site communicates with the remotely deployed faxing system to send, receive, obtain status on, or perform other functions associated with, faxing.

Because, in most cases, fax users already perform faxing utilizing fax servers, fax appliances, fax software, etc. connected to an computer based network (e.g. an IP (or other protocol) based network), faxing can be accomplished using embodiments of such systems and methods substantially without deviation from the user's previous faxing methodologies or workflows. Thus, such users can use their familiar fax environment without the restrictions of using a browser and without the need to maintain local telephony hardware, licenses, or telephone lines.

Turning now to FIG. 1, one embodiment of an architecture of just such a faxing system is depicted. Fax architecture 100 includes a fax connector 106, fax intermediary system 130 and fax sender/receiver (s/r) system 140 communicating over a computer based network 170 which may be, for example, the Internet, an internet, an intranet, a LAN a WAN, an IP based network, etc. Fax intermediary system 130 has access to a data store 136. Fax s/r system 140 includes one or interface to PSTN 120 and is configured to send or receive faxes over the PSTN 120.

Fax connectors 106 are installed at a site where users wish to send faxes. Users 102 in such an architecture 100 may be companies, individual users, or any other entity wishing to send or receive faxes. Accordingly, fax connector 106 may be one or more computing devices or one or more computer processes executing on one or more computer devices utilized by such users 102 to send or receive faxes. Fax connector 106 provides an interface such as an API or hardware interface through which a fax to send may be received from a client 104 of the fax connector 106. These clients 104 may include a fax machine, a printer, an enterprise resource planning (ERP) system, etc. The fax connector 106 may communicate with fax intermediary system 130 over network 110 to send such a receive fax or to receive faxes.

Fax intermediary system 130 may be one or more computing devices comprising a fax connector facing service 132 and a fax s/r facing service 134. The fax connector facing service 132 may be configured to receive a fax; store the fax in data store 136; report on a status of a previously received fax to be sent; determine if there are any faxes associated with a requestor in the data store 136; obtain faxes from the data store 136; and return one or more of these faxes to a requestor. Thus, fax connector facing service 132 may present an interface through which a request to send a fax may be received along with the document and phone number associated with that fax; an interface through which a request to check the status of a fax may be received and a status returned to the requestor; and an interface by which a request to determine if there are any faxes associated with a requestor may be received and one or more faxes associated with that requestor returned.

Fax s/r facing service 134 may be configured to determine a fax to send from data store 136; obtain and return a fax from the data store 136; receive a status on a sent fax; update the status of a sent fax in data store 136; receive a fax; and store a received fax in the data store 136. Accordingly, fax service 134 may present an interface through which a request to determine if there are any faxes to send may be received and one or more faxes returned; an interface through which a request to update the status on a fax may be received along with data identifying the fax and the status on the fax; and an interface through which a received fax can be received including the document and one or more phone numbers associated with the received fax.

Fax s/r facing service 134 may communicate with fax s/r system 140 over network 110 to send or receive a fax. Fax s/r system 140 includes fax s/r service 142. Fax s/r service 142 is configured to request a fax to send at a certain time interval and send any faxes received in response to this request over the PSTN 120; update the status of a sent fax; receive a fax over the PSTN 120; and upload a received fax.

Accordingly, when a user 102 in architecture 100 wishes to send a fax he may utilize a client 104 at the user's site to send the fax. Client 104 provides the fax to the fax connector 106 through the interface provided by the fax connector 106. Fax connector 106 then sends a request to fax connector facing service 132 to send the fax. Fax connector facing service 132 stores the fax received from the fax connector 106 in the data store 136. At some point, fax s/r service 142 sends a request to fax s/r facing service 134 to determine if there are any faxes to send. Fax s/r facing service 134 may receive the request, determine that there is a fax stored in the data store 136 to be sent and return this fax to the fax s/r service 142. Fax s/r service 142 may receive this fax and send the fax to its destination over the PSTN 120.

During the sending of the fax, or thereafter, the fax s/r service 142 may send a status of the fax to fax s/r facing service 134. Fax s/r facing service 134 may then update the status of the fax in the data store 136. At some point, then, the fax connector 106 may send a request to the fax connector facing service 132 inquiring as to the status of the fax. Fax connector facing service 132 may obtain the status of the fax from the data store 136 and return it to the fax connector 106, which may present it to a user at the user's site.

Similarly, a fax may be received at fax send/receive service 142 over PSTN 120. When such a fax is received, fax s/r service 142 may send the fax to the fax s/r facing service 134. Fax s/r facing service 134 may determine the fax connector 106 associated with the fax and store the fax in the data store 136. At some point, then, the associated fax connector 106 may send a request to the fax connector facing service 132 to determine if there are any faxes associated with the fax connector 106. Fax connector facing service 132 may obtain the associated fax from the data store 136 and return the fax to the fax connector 106 which may then present the received fax to a user through the interface provided by the fax connector 106.

While it should be understood from a review of the above description that embodiments as disclosed may be implemented using a wide variety of architectures and hardware or software systems; that a fax intermediary system and a fax s/r system may be one or multiple systems that may or may not be distributed; that all of the services presented may or may not be one or multiple services with one or more interfaces; and that these one or more services may be implemented and accessed in a variety of manners, it will be useful here to describe a particular embodiment in more detail.

As discussed above, in some cases it is desirable to remove telephony from a user's site. However, embodiments of the systems and methods disclosed herein may have many users. Thus, entities implementing or administering embodiments of the systems and methods presented herein may be responsible for multiple phone lines associated with multiple users. As phone lines require a relatively large amount of infrastructure it may be desirable to centralize management of the telephone lines associated with these users. As the users themselves may be geographically distributed it is also desirable to maximize such user's access to the fax intermediary system to reduce downtime and allow substantially simultaneous access from multiple users to the fax intermediary system.

Therefore, in one embodiment, an entity implementing embodiments of the systems and method disclosed herein may implement the fax s/r system at a location over which they maintain control while the fax intermediary system may be implemented in a cloud based computing environment. By maintaining control of the access to the PSTN at a central location under the control of the entity, user's security concerns about access to the PSTN may be assuaged.

The service or services of the fax intermediary system may, however, be deployed using a cloud based service provider, such as Microsoft Windows Azure, Amazon EC2, vMware vCloud, Google's cloud, etc. By deploying the services of the fax intermediary system in the cloud, such services can utilize the storage and functionality provided by the cloud provider while achieving increased accessibility and reliability and simultaneously alleviating the entity providing embodiments of such faxing systems and methods from the need to maintain the hardware or connectivity necessary for the provisioning of such services.

Figure 2:
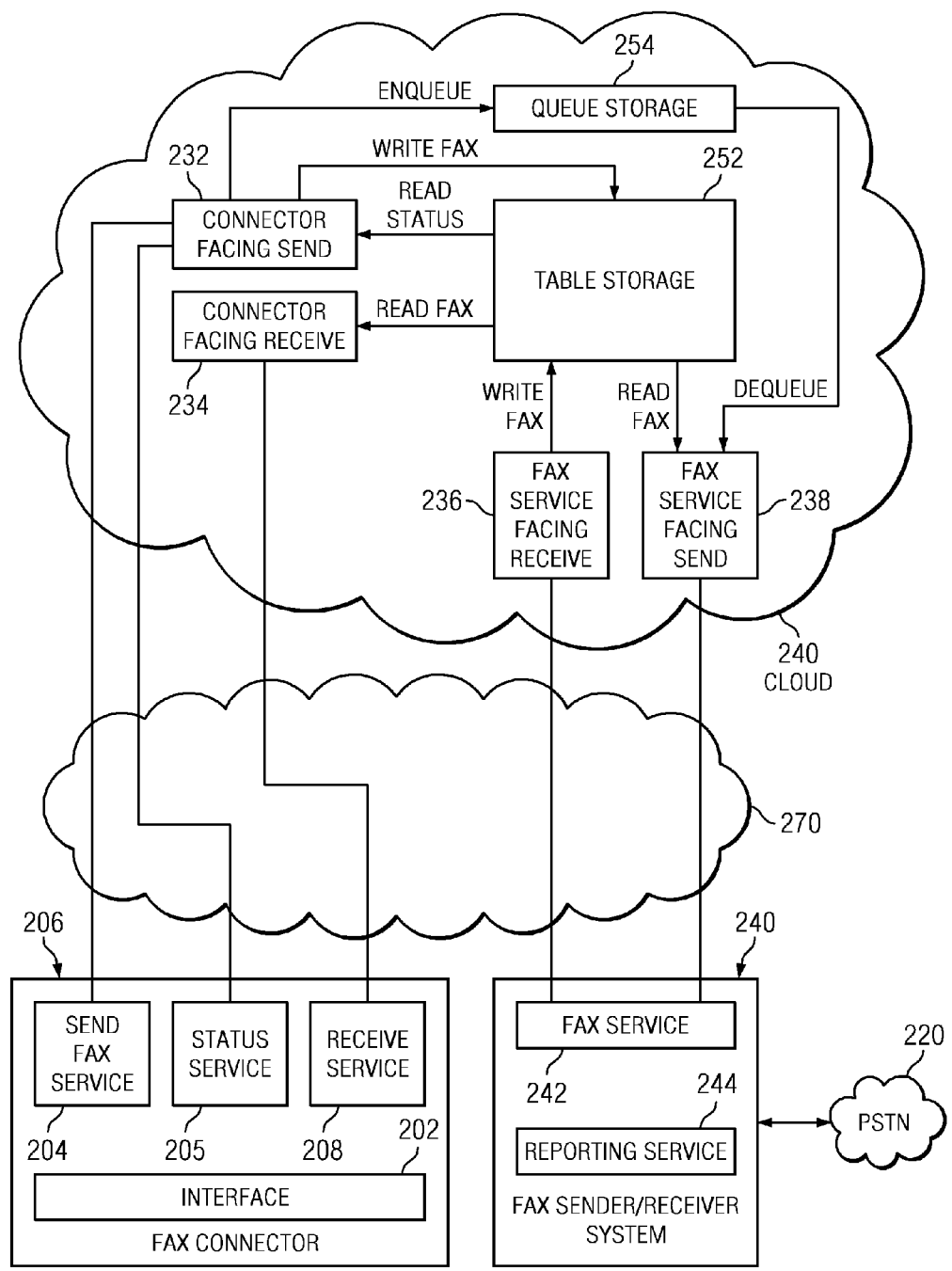
FIG. 2 depicts one embodiment of an architecture for a faxing system.

With that in mind, turning now to FIG. 2, one embodiment of an architecture of a faxing system where certain services are deployed in a cloud based computing environment are depicted. Fax architecture 200 includes a network 270 over which a fax connector 206, fax sender/receiver (s/r) system 240 and a set of fax services deployed in a cloud based computing environment may communicate.

Fax connector 206 is provided at a site where users wish to send and receive faxes and may have an associated identifier (i.e. the fax connector identifier). One or more telephone numbers associated with a user's fax line are configured such that any calls to those numbers are received over PSTN 220 at phone lines coupled to fax s/r system 240. Thus, providers of embodiments as depicted herein may notify or otherwise arrange with telephony providers, to configure one or more telephone numbers associated with the user employing fax connector 206 such that calls to these numbers received at telephone lines of PSTN coupled to fax s/r system 240.

Fax connector 206 provides an interface 202 through which a client of the fax connector 206 may send faxes, receive faxes, check the status on sent faxes, etc. Fax connector 206 comprises three services: send fax service 204, status service 205 and receive service 208. Send fax service 204 may be configured to receive a document and a phone number from the interface, convert the document to a particular format (e.g. TIFF) if desired, send a request that the fax be sent and receive an identifier for that fax in return. Status service 205 may be configured to send a request for status on a sent fax along with a fax identifier, receive the status of the fax in return and present this status to a user through interface 202. Receive service 208 may be configured to send a request to identify any faxes received for the user along with the fax connector identifier for the fax identifier 206 and receive one or more faxes returned in response to this request.

Cloud 240 may be a cloud based computing platform such as Microsoft Windows Azure Platform or the like. The set of faxing services deployed in the cloud include a connector facing send 232, connector facing receive 234, a fax service facing receive 236 and a fax service facing send 238. These services may have one or more interfaces that may be accessed over network 270 using hypertext transfer protocol (http) calls or other types of network protocols or interfaces.

The cloud 240 may also provide certain services that may be utilized by the deployed set of faxing services, such services may include, for example the Microsoft Windows Azure Storage services such as table storage 252, queue storage 254 or other forms of storage not depicted such as blob storage, etc. This storage may be used during operation of the set of service and may store various configuration information associated with the services. For example, queue storage 254 may be used to store entries associated with faxes to send, where each entry in the queue is associated with a job identifier for that fax while table storage 252 may be used to store a mapping table, a send fax table and a received fax table.

The mapping table may associate phone numbers with fax connector identifiers. Thus, for example, if a user's telephone number has been configured such that calls to this number is received at telephone lines of PSTN 220 coupled to fax s/r system 240 there may be an entry in the mapping table associating this phone number with the fax connector identifier for that user's fax connector 206. The send fax table may associate job identifiers associated with entries in the queue with various data associated with a corresponding fax, including the document of the fax, the telephone number where the fax is to be sent, a fax connector identifier associated with the fax, a status associated with the fax, or other information. The received fax table may also be stored in the table storage 252, where the received fax table may include the document of the received fax, a fax connector identifier associated with fax connector where the fax is to be sent, the telephone number from which the fax was received, or other information. Other services provided by the cloud 240 (not depicted) may also be utilized (e.g. in the case of Microsoft Windows Azure Platform: Web Role, Worker Role, VM Role, Access Control, Content Delivery Network, Caching, etc. Other services in other cloud based computing platforms may also be utilized).

The connector facing send 232 may have an interface for sending faxes through which a request to send a fax may be received. Such a request may include the document to be faxed (which may be in TIFF format or another electronic format) and a phone number where the fax is to be sent. When such a request is received, the connector facing send 232 may enqueue that fax in queue storage 254, store data associated with the fax in the table storage 252 and return an identifier of the fax (i.e. a fax identifier) to the fax connector 206. Connector facing send 232 may additionally have an interface through which a status inquiry may be received along with a fax identifier. In response, connector facing send 232 may access the table storage 252 to read a status of the fax corresponding to the fax identifier from the table storage 252 and return the status of the fax to the requestor.

Connector facing receive 234 may have an interface through which a request for received faxes may be received along with a fax connector identifier. In response, the connector facing receive 234 may access table storage 252 to determine if there are any received faxes associated with the fax connector identifier. One or more of these faxes may be returned to the requestor by connector facing receive 234.

Fax service facing send 238 may have an interface through which a request for faxes to send may be received. In response, the fax service facing send 238 may access queue storage 254 to determine if there are any faxes waiting to be sent and select one or more of these faxes based on a priority. As will be noted queue storage 254 may be a type of queue (e.g. Microsoft Messaging Queue (MSMQ), IBM MQSeries, etc.) that allows priority to be implemented in conjunction with the queue. Thus, entries in the queue associated with faxes may be selected based on almost any priority desired, for example, timing, quality of service, source or destination, or some other criteria. When a fax has been selected, the fax identifier may be used to access the fax in the table storage 252 and the fax returned to the requestor.

The fax service facing send 238 may also have an interface through which a request to update the status of the fax may be received along with a status and a fax identifier. The fax service facing send 238 may then update the status of the fax in the table store 252.

Fax service facing receive 236 may have an interface through which a request to upload a received fax may be received, along with the document and telephone number from which the fax was received. When such a request is received, the fax service facing receive 236 may access the table storage 252 to determine a fax connector identifier associated with the phone number from which the fax was received and store the fax in association with the fax connector identifier in the table storage 252.

Fax service 242 is configured to request a fax to send at a certain time intervals, receive a fax identifier, a document, and an associated telephone number in response and send the received fax to the telephone number over the PSTN 220. During the sending of the fax the fax service 242 can send a request to update the status of the fax along with the fax identifier and an updated status. Such a request may be sent one or more times while the fax service is sending the fax over the PSTN 220 (e.g. a request may be sent after each page is sent, after the entire fax is completed, etc.). Fax service 242 may also receive faxes over PSTN 220. When a fax is received the fax service 242 may send a request to upload the fax along with the document and the telephone number from which that fax was received.

Figure 3B:
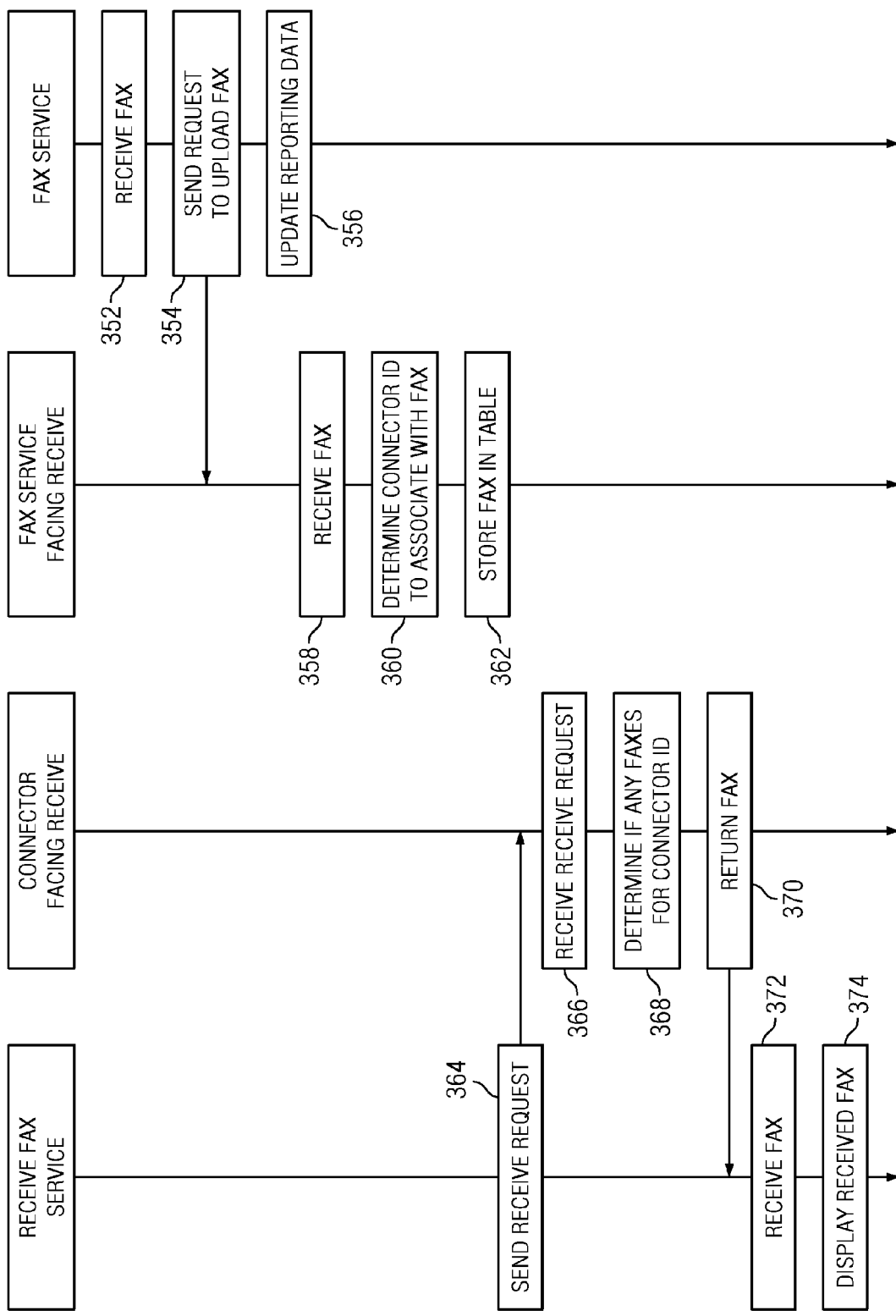

As can be seen then, the fax connector, fax s/r system and the set of fax services deployed in the cloud may interact to send, deliver and receive faxes. Embodiments of this process may be illustrated in more detail with reference to FIGS. 3A1-3B. Referring first to FIG. 3A1-3A3, one embodiment of a method for the sending of a fax employing an architecture including cloud based fax services is depicted. Initially at step 302 a user wishing to send a fax may provide a document and an associated phone number as a destination for the document. The document may be received by the send service of the fax connector at the user's site and, at step 304, may be converted (e.g. to a Tagged Image File Format (TIFF) or another format) by the send fax service of the fax connector at the user's site. Alternatively, the document may not be converted, or may be converted at another location. The send fax service of the user's fax connector can then send a request to the connector facing send service deployed in the cloud at step 306 requesting that a fax be sent. The request may include the document and the destination phone number (or these may be sent subsequently).

When this send request is received by the connector facing send service in the cloud at step 308, the connector facing send service may enqueue a job in queue storage for the sending of the fax associated with the received send request at step 310. When the job is enqueued, the queue storage in the cloud may return a job identifier associated with the created entry in queue storage. This job identifier is utilized by the connector facing send service to create an entry in table storage at step 314, where the entry associates the job identifier for the fax with the document and phone number provided in the request. The connector facing send service can then reply to the send service of the fax connector with the job identifier at step 316. The send service of fax connector may receive and store this job identifier at step 318 such that it may be utilized in subsequent processing, such as for example, a subsequent status inquiry.

At some point then, at step 319 the fax service may send a request to the fax service facing send service to determine if there are any faxes to be sent. Fax service facing send service may receive this request at step 320, access the queue storage to determine if there are any job entries in the queue storage and determine one or more of these jobs at step 322. As discussed above, this determination may be based on a priority associated with entries in the queue storage.

If there is a job to be sent, the job identifier of the determined entry may be determined from the entry in the queue. This job identifier may be utilized to access the entry in the table storage associated with that job identifier and the document and phone number associated with the job identifier read from the table at step 324 and returned to the fax service at step 326. In some cases the job identifier may also be sent to the fax service to be utilized for subsequent processing, for example, status updates and the like.

The fax service may receive the fax at step 328 and send the fax to the phone number over the PSTN at step 330. During the sending of the fax over the PSTN the fax service may send one or more requests to the fax service facing send service to update the status of the fax during or after sending of the fax over the PSTN. This request may include a job identifier of the fax and a status (such as transmitted, failed, o.k., etc.) or an associated time. The fax service can also update a reporting service at step 334, such that data on sent faxes may be accessed or otherwise processed.

Fax service facing send service may receive the status update request at step 336 and update the entry in the table storage associated with the job identifier with the received statues at step 338.

At some point then, status service of the user's fax connector may send a status query request to the connector facing send service at step 340. This request may contain a previously provided job identifier as discussed above. The connector facing send service may receive the status inquiry request at step 342, access the table storage to determine the job status at step 344 and return the job status at step 346. The status service of the fax connector can then receive and display the job status to the user at step 348.

Moving now to FIG. 3B, one embodiment of a method for the reception of a fax employing an architecture including cloud based fax services is depicted. As discussed above, the PSTN is configured such that calls on one or more phone numbers associated with a particular fax connector are received at the fax service. Similarly, then, a table may exist in the table storage of the cloud based fax service that has entries mapping these phone numbers to the fax connector identifier associated with that fax connector.

Initially, then, at step 352, the fax service may receive a fax associated from a phone number over the PSTN. The fax service may then send a request to upload a received fax to the fax service facing receive service at step 354. This request may include the document received along with the phone number from which it was received and the phone number of the fax's intended destination (or the document and phone number may be sent at a subsequent time). The fax service can also update a reporting service at step 356, such that data on received faxes may be accessed or otherwise processed.

The fax service facing receive may receive the request to upload the fax at step 358. At step 360 the fax service facing receive service may then access the table mapping phone numbers to fax connector identifiers to determine the fax connector identifier associated with the destination phone number. The fax is then stored in an entry in table storage in association with the associated fax connector identifier at step 362. Other information may also be associated with the entry, including, for example, the time received, the phone number from which it was sent, the destination phone number, etc. If, a associated fax connector identifier cannot be found, the fax may be stored in a dead letter table, and the reporting data updated.

At some point, then, at step 364 the receive service of the fax connector may send a request to the connector facing receive service. This request may identify the fax connector using the fax connector identifier for that fax connector. When this request is received at the connector facing receive service at step 366, the connector facing receive service determines at step 368 if there are any faxes associated with that fax connector identifier of the request by accessing the table storage to determine if there are any entries in the received fax table associated with that fax connector identifier. If any entries are found in the table storage one or more of the faxes may be returned to the receive service at step 370. The determination of which of the faxes to return may be based on almost any criteria desired, such as time received or the like. Additionally, multiple faxes may returned in response to a received request. More specifically, the connector facing receive service may access an entry associated with the fax connector identifier to obtain the document and telephone number to which the fax was sent or from which the fax was received. This document along with one or more of the phone numbers may be returned to the receive service of the fax connector.

When the receive service of the fax connector receives the fax at step 372, it may display the received fax at step 374 through its interface. This may entail displaying the fax through a computer display, printing the fax on a client device or some other method of display entirely.

As can be seen then, using embodiments of the systems and methods disclosed herein a user can use their familiar fax environment without the restrictions of using a browser and without the need to maintain local hardware, licenses, or telephone lines. However, the user can see status updates associated with outbound faxes in their local system as they would using conventional techniques. Additionally, received faxes may come into the user's local system leveraging the rules and workflows to which they are accustomed.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for faxing, comprising:
receiving a request to send a first fax at a set of services embodied on at least one server machine deployed at a location remote from a user's site, wherein the request was sent from a first fax connector at the user's site over a computer based network;
receiving, at the set of services, a first document and a first destination telephone number associated with the first fax from the user's site over the computer based network;
sending the first fax from the location remote from the user's site to the first destination telephone number over a publicly switched telephone network (PSTN) via the set of services;
receiving a second fax at the set of services over the PSTN;
receiving, at the set of services, a second document and a second destination telephone number associated with the second fax over the computer based network;
determining a fax connector identifier associated with the second destination telephone number; and
sending the second document to a second fax connector associated with the fax connector identifier over the computer based network.

2. The method according to claim 1, wherein the set of services is deployed on a cloud based computing platform.

3. The method according to claim 1, further comprising:
receiving a request for a status of the first fax at the set of services, wherein the request for the status was sent from the first fax connector over the computer based network;
determining the status of the first fax; and
returning the status to the first fax connector over the computer based network.

4. The method according to claim 1, wherein the first fax connector and the second fax connector are different.

5. The method according to claim 1, wherein the first fax connector is same as the second fax connector.

6. The method according to claim 1, further comprising:
receiving a request to determine if there are any received faxes to send at the set of services, wherein the request was sent from the second fax connector over the computer based network, wherein the determination of the fax connector identifier and sending of the second document is done in response to the request from the second fax connector to determine if there are any received faxes.

7. The method according to claim 1, further comprising:
receiving from the first fax connector a status query request, the status query request including a previously provided job identifier;
accessing a table storage to determine a job status associated with the status query request; and
returning the job status to the first fax connector for displaying of the job status to a user.

8. The method according to claim 1, further comprising:
receiving a request to upload the first fax;
accessing a table mapping phone numbers to fax connector identifiers to determine the fax connector identifier associated with the destination phone number; and
storing the first fax in an entry in a table storage in association with the fax connector identifier.

9. The method according to claim 1, further comprising:
receiving a request from the first fax connector including the fax connector identifier to determine if there are any faxes associated with the fax connector identifier;
determining if there are any faxes associated with the fax connector identifier of the request by accessing a table storage to determine if there are any job entries in a received fax table associated with that fax connector identifier; and
if any job entries are found in the table storage, returning one or more of the faxes to the first fax connector.

10. The method of claim 9, further comprising:
accessing an entry associated with the fax connector identifier to obtain each document and each telephone number to which each fax of the one or more of the faxes was sent or from which each fax was received; and
returning the each document along with the each phone number to the first fax connector.

11. A method for faxing, comprising:
receiving a request to send a first fax at a set of services embodied on one or more server machines deployed at a location remote from a user's site, wherein the request was sent from a first fax connector at the user's site over a computer based network, the first fax connector associated with a fax connector identifier;
receiving a first document and a first destination telephone number associated with the first fax from the user's site over the computer based network;
sending the first fax from the location remote from the user's site to the first destination telephone number over a publicly switched telephone network (PSTN) via the set of services;
receiving a second fax at the set of services, wherein the second fax was received over the PSTN at the fax service and was sent to the set of services over the computer based network;
receiving, at the set of services, a second document and a second destination telephone number associated with the second fax over the computer based network, the second destination telephone number associated with the fax connector identifier; and
sending the second document to the first fax connector over the computer based network.

12. The method according to claim 11, wherein the set of services is deployed on a cloud based computing platform.

13. The method according to claim 11, further comprising:
receiving a request for a status of the first fax at the set of services, wherein the request for the status was sent from the fax connector over the computer based network;
determining the status of the first fax; and
returning the status to the fax connector over the computer based network.

14. The method according to claim 11, further comprising:
receiving a request to update the status of the first fax at the set of services, wherein the request to update the status was sent from the fax service over the computer based network; and
updating the status of the first fax.

15. The method according to claim 11, further comprising:
receiving a request to determine if there are any faxes to send at the set of services, wherein the request was sent from the fax service over the computer based network;
determining that the first fax is to be sent; and
returning the first document and the first destination telephone number to the fax service over the computer based network in response to the request.

16. The method according to claim 11, further comprising:
receiving a request to determine if there are any received faxes to send at the set of services, wherein the request was sent from the first fax connector over the computer based network, wherein the determination of the fax connector identifier and sending of the second document is done in response to the request to determine if there are any received faxes.

17. The method according to claim 11, further comprising:
receiving a request to determine if there are any faxes to send at the set of services, wherein the request was sent from the fax service over the computer based network;
accessing a queue storage to determine if there are any job entries in a queue; and
determining one or more of the job entries based on a priority associated with the job entries in the queue.

18. The method according to claim 17, further comprising:
if there is a job to be sent, determining a job identifier of a job entry from the job entries in the queue;
utilizing the job identifier to access the job entry in a table storage associated with the job identifier; and
reading a document and a phone number associated with the job identifier from the table storage and returning the document and the phone number to the fax service.

19. The method according to claim 11, further comprising:
receiving one or more requests from the fax service during sending of the first fax over the PSTN to update a status of the first fax during or after sending of the first fax over the PSTN, the one or more requests include a job identifier of the first fax and the status of the first fax.

20. The method according to claim 19, further comprising:
receiving a status update request and updating a job entry in a table storage associated with the job identifier with the received status.

* * * * *